Oct. 10, 1967   G. R. SNYDER   3,346,420
AQUEOUS ELECTROLYTE EMULSION
Filed June 24, 1965
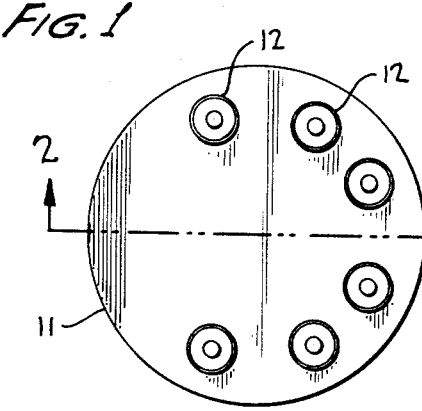
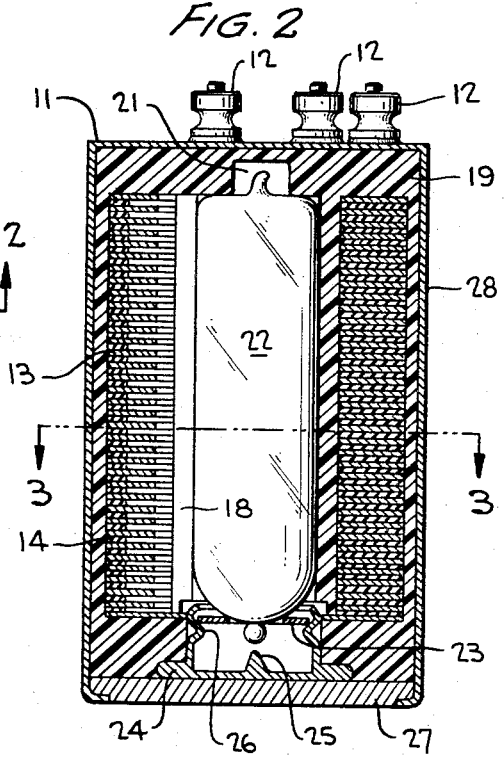
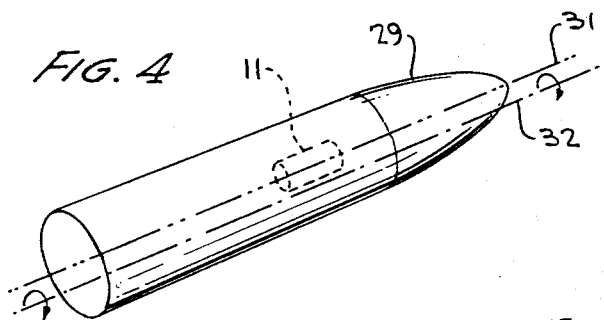
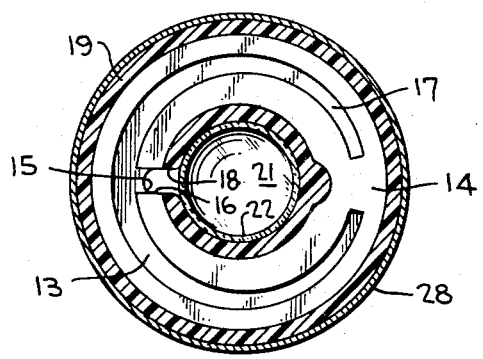
INVENTOR,
GILBERT R. SNYDER
BY: Harry M. Saragovitz,
Edward J. Kelly,
Herbert Berl &
Charles L. Whitham

United States Patent Office 3,346,420
Patented Oct. 10, 1967

3,346,420
AQUEOUS ELECTROLYTE EMULSION
Gilbert R. Snyder, Arlington, Va., assignor to the United States of America as represented by the Secretary of the Army
Filed June 24, 1965, Ser. No. 468,674
6 Claims. (Cl. 136—90)

The invention described herein may be manufactured and used by or for the Government of the United States of America for governmental purposes without the payment to me of any royalty thereon.

This invention relates generally to reserve type spin batteries and more particularly to an improved aqueous electrolyte emulsion for reserve type spin batteries.

The conventional practice of activating an aqueous electrolyte spin battery is to break the glass ampule containing the electrolyte by setback and causing the battery plate area to be filled with the electrolyte by spin. There must be a certain quantity of electrolyte to fill the battery. Under most conditions of setback and spin forces the electrolyte fills certain cells completely full leaving other cells completely dry. The full cells have a tendency to short circuit and drain in a short time, resulting in a dead battery. In the past it has been nearly impossible to obtain the uniform filling under the various setback with spin forces to which the reserve battery is subjected.

It is therefore an object of this invention to provide improved electrolyte emulsion for reserve type spin batteries which permits uniform filling of the cells within the battery.

It is another object of the present invention to provide an aqueous electrolyte emulsion which eliminates the possibility of short circuits between cells in reserve type spin batteries.

It is a further object of the instant invention to provide an electrolyte emulsion which allows all cells to be evenly filled under off-center spin conditions in a reserve type spin battery.

According to the present invention the foregoing and other objects are obtained by providing a stable emulsion of electrolyte and insulating liquid, the insulating liquid having a density less than the electrolyte.

The specific nature of the invention, as well as other objects, uses and advantages thereof, will clearly appear from the following description and from the accompanying drawing, in which:

FIG. 1 is a plan view of a reserve type spin battery;

FIG. 2 is a cross-sectional view of the reserve type spin battery illustrated in FIG. 1 taken along line 2—2;

FIG. 3 is a cross-sectional view of the reserve type spin battery shown in FIG. 2 taken along line 3—3; and FIG. 4 illustrates the reserve type spin battery contained in a projectile which has an off-center axis of spin.

Referring now to the drawing wherein like reference numerals designate identical or corresponding parts throughout the several views and more particularly to FIGURES 1, 2 and 3, wherein there is illustrated a battery 11 having a cylindrical configuration. The battery 11 is provided at one end with a plurality of terminals 12 which permit electrical connection to any of several groups of cells. Three pairs of terminals 12 are illustrated which is the number of terminals required for connection to A, B and C batteries assembled into one structure. The cells of battery 11 comprise the plurality of annularly shaped plates 13 separated by a plurality of paper separators 14. The annularly shaped plates 13 are of an electrically conducting material having one surface coated with lead and the other surface coated with lead dioxide. The annularly shaped plates 13 are stacked in such a manner as to place the lead coated surface on one plate facing the lead dioxide coated surface of the next adjoining plate. Each plate 13 has a notch 15 cut in the inner diameter thereof. Each paper separator 14 has an entry port 16 and an eccentric flow channel 17 formed therein. In the construction of the battery 11, the entry ports 16 of each paper separator 14 are registered with one of the notches 15 of each of the plates 13 such that, in the stacked cells, the notches 15 and the ports 16 are aligned to form a fill channel 18. The stacked cells are potted in an elastomeric molding compound 19 which completely encloses the entire cell stack except for the ampule cavity 21 and the fill channel 18 interconnecting the various cell elements with the ampule cavity. A glass ampule 22 containing the electrolyte is slideably positioned in the ampule cavity 21. The ampule 22 is supported by an annular ampule support disc 23. A breaker platform 24 is positioned in an axial alignment and in communication with the ampule cavity 21. The breaker platform 24 has a projection 25 in the base thereof which is pointing toward the glass ampule 22. A plurality of nipples 26 formed on the inner side wall of the breaker platform 24 make frictional contact with the ampule support disc 23. The frictional contact between the nipples 26 and the support disc 23 are sufficient to maintain the ampule 22 supported above the projection 25 during normal handling and shipping but are insufficient to support the ampule under the setback forces which occur on the firing of a projectile. The breaker platform 24 is supported by a base member 27 and the assembly is enclosed in a metallic battery case 28.

As illustrated in FIG. 4 the battery 11 is located within a projectile 29 along the axis 31 which is usually coincident with the spin axis 32 of the projectile. When the projectile is fired the setback forces due to the forward acceleration are sufficient to move the ampule support disc 23 past the nipples 26 thereby allowing the ampule 22 to strike the projection 25 in the base of the breaker platform 24 with sufficient force to break the ampule. When the ampule 22 is broken some of the cells are partially filled by the splash of the electrolyte. After the projectile leaves the muzzle of the gun the deceleration of the projectile allows the electrolyte to flow up the fill channel 18 and the spin of the projectile forces the electrolyte through the entry ports 16 into the cells to activate the battery. The cells of the battery 11 are therefore filled from the bottom of the stack upward in successive order except for some splash filling. In practice however, uniform filling of all the cells is seldom achieved. Often the uppermost cells in the battery's back receive little or no electrolyte and therefore remain inactive. At the same time, the lowermost cells receive an excess of electrolyte, which causes short circuiting between adjacent cells. The problem of uniform filling of the cells in the battery stack with electrolyte becomes even more difficult when the battery 11 is located off the spin axis 32, as where the projectile 29 has a slight wobble during its flight, indicated by the noncoincidence of axes 31 and 32 in FIGURE 4.

The present invention overcomes these serious disadvantages by providing a stable emulsion of electrolyte and insulating liquid. The insulating liquid must have a density less than the electrolyte, be a good non-conductor, and be chemically stable in the electrolyte. An example of such an emulsion consists of 90% electrolyte comprising 45% fluoroboric acid which has a density of 1.32 at 20° centigrade and 10% heptane which has a density of 0.68 at 20° centigrade, the heptane being an organic insulating liquid. An excess of this emulsion is used to properly activate the cell. The setback force will break the glass ampule 22 flooding all the cells of the battery, with some amount of the emulsion remaining within the center ampule cavity 21. Spinning of the battery, whether on center or off center, will separate the electrolyte and the insulating liquid, with the less dense insulating liquid moving toward the center, and the electrolyte moving toward the outside where the battery plates are located. Since an excess quantity of the emulsion is used all of the cells in the battery's stack receive electrolyte. Short circuits between adjacent cells are prevented by the insulating liquid.

It will be apparent that the embodiments shown are only exemplary and the various modifications can be made in construction and arrangement within the scope of the invention as defined in the appended claims.

I claim as my invention:

1. An aqueous electrolyte emulsion for a reserve type spin battery comprising a stable emulsion of fluoroboric acid and heptane, said fluoroboric acid being an electrolyte and said heptane being an organic insulating liquid.

2. An aqueous electrolyte emulsion as recited in claim 1, wherein the proportion of fluoroboric acid to heptane is 9 to 1.

3. An aqueous electrolyte emulsion as recited in claim 2 wherein said fluoroboric acid is a 45% solution.

4. An improvement in a reserve type spin battery adapted for activation upon release of electrolyte from a frangible ampule when the ampule is forced against a projection at the bottom of said battery by setback forces, said electrolyte being forced into a plurality of cells surrounding said frangible ampule by spin forces, said improvement comprising a quantity of an aqueous electrolyte emulsion greater than is required to fill all the cells in said battery, said electrolyte emulsion comprising a stable emulsion of an electrolyte and an insulating liquid, said insulating liquid having a density less than said electrolyte.

5. An improvement in a reserve type spin battery as recited in claim 4, wherein said electrolyte comprises fluoroboric acid and said insulating liquid is an organic insulating liquid.

6. An improvement in a reserve type spin battery as recited in claim 5, wherein an organic insulating liquid is heptane.

No references cited.

WINSTON A. DOUGLAS, *Primary Examiner.*
BENJAMIN R. PADGETT, CARL D. QUARFORTH, *Examiners.*

A. J. STEINER, C. F. LE FEVOUR, *Assistant Examiners.*